United States Patent [19]

Suesada

[11] Patent Number: 4,847,701
[45] Date of Patent: Jul. 11, 1989

[54] SUB-NYQUIST SAMPLING APPARATUS WITH IMPROVED EFFECTS PROCESSING

[75] Inventor: Kunio Suesada, Ikoma, Japan

[73] Assignee: Matsushita Electric Industrial Co., Ltd., Kadoma, Japan

[21] Appl. No.: 147,642

[22] Filed: Jan. 25, 1988

Related U.S. Application Data

[63] Continuation of Ser. No. 760,250, Jul. 29, 1985, abandoned.

[30] Foreign Application Priority Data

Jul. 31, 1984 [JP] Japan ................. 59-161701

[51] Int. Cl.$^4$ ............................................. H04N 5/92
[52] U.S. Cl. .................................... 358/335; 358/312; 360/32; 360/33.1
[58] Field of Search ............... 358/335, 337, 338, 339, 358/13, 160, 310, 312, 314; 360/32, 39, 33.1; 328/151; 333/173

[56] References Cited

U.S. PATENT DOCUMENTS

| | | | |
|---|---|---|---|
| 4,039,979 | 8/1977 | Carbrey | 333/173 |
| 4,065,784 | 12/1977 | Rossi | 358/13 |
| 4,227,204 | 10/1980 | Rossi | 358/13 |
| 4,322,697 | 3/1982 | Carbrey | 328/151 X |
| 4,322,739 | 3/1982 | Drewery et al. | 358/13 |
| 4,381,519 | 4/1983 | Wilkinson et al. | 358/314 X |
| 4,460,925 | 7/1984 | Devereux | 358/312 |
| 4,509,185 | 4/1985 | Grunberg | 360/32 X |
| 4,602,285 | 7/1986 | Beaulier et al. | 358/160 |
| 4,633,330 | 12/1986 | Yamamitsu et al. | 358/310 |

OTHER PUBLICATIONS

Yokoyama et al., An experimental Digital Videotape Recorder, SMPTE Journal, vol. 89, 3/80, pp. 173-180.
Yoshino et al., Digital Frame Memory for Still Picture Television Receivers–PASS Encoding System and Application, SMPTE Journal, vol. 89, 4/80, pp. 257-262.

Primary Examiner—Alan Faber
Assistant Examiner—W. R. Young
Attorney, Agent, or Firm—Cushman, Darby & Cushman

[57] ABSTRACT

A digital type VTR or the like image signal recording and reproducing apparatus using sub-Nyquist sampling on the image includes an interpolator circuit for carrying out interpolation on a signal based on correlation between image signals in neighboring fields. The interpolator circuit is by-passed when high speed reproducing is carried out.

3 Claims, 3 Drawing Sheets

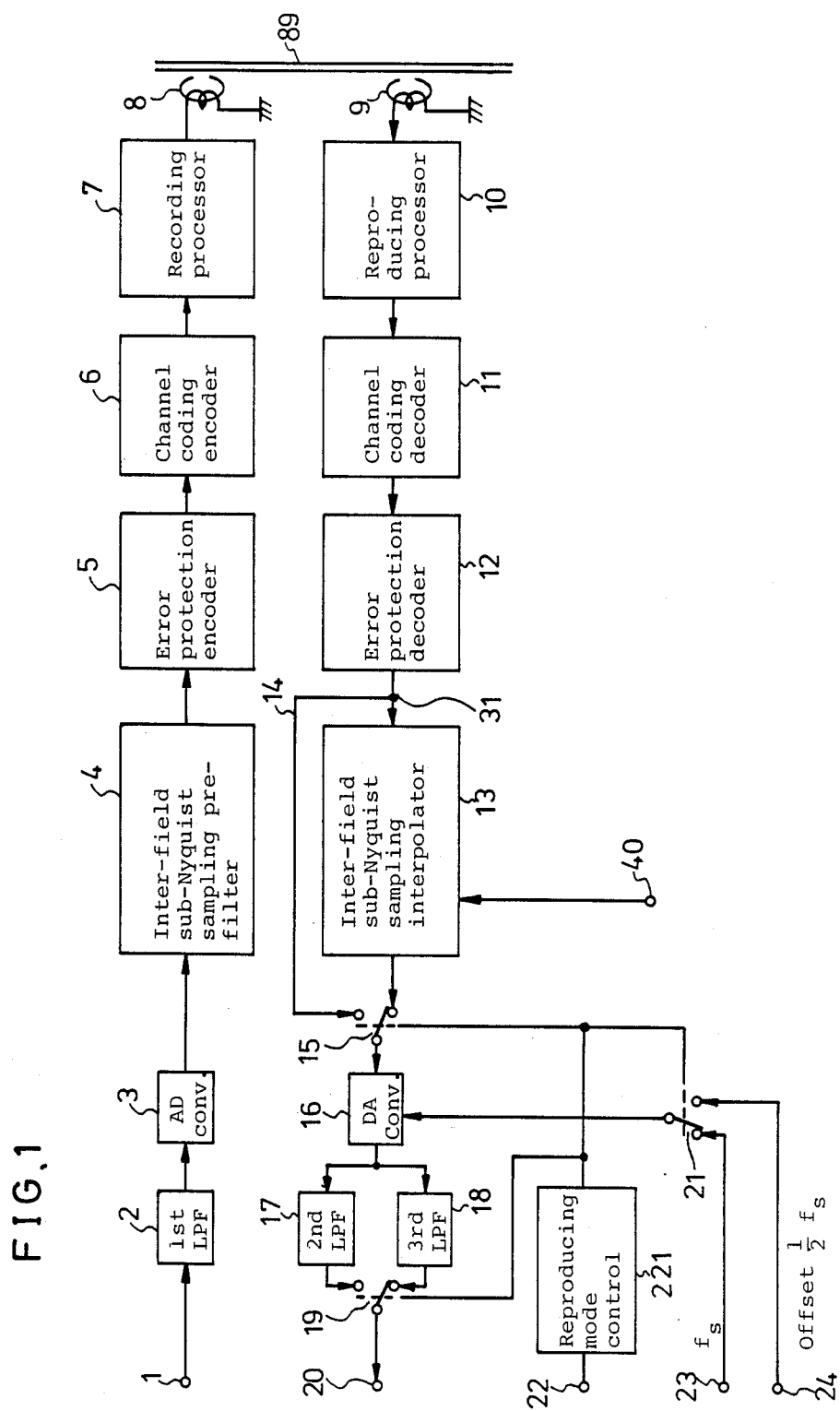

FIG. 2  ( X are pixels which are thinned out.)
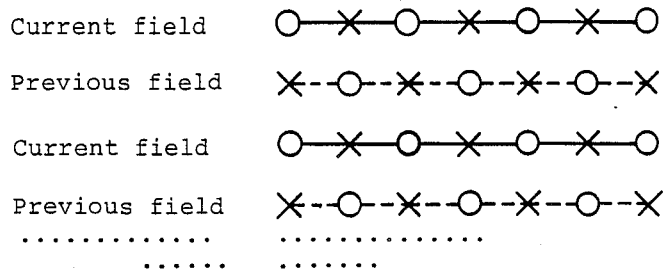
FIG. 3
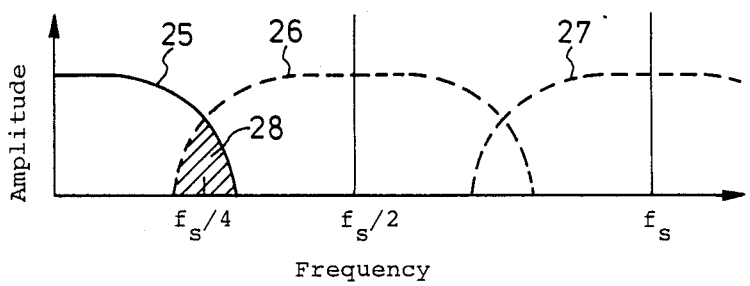
FIG. 4
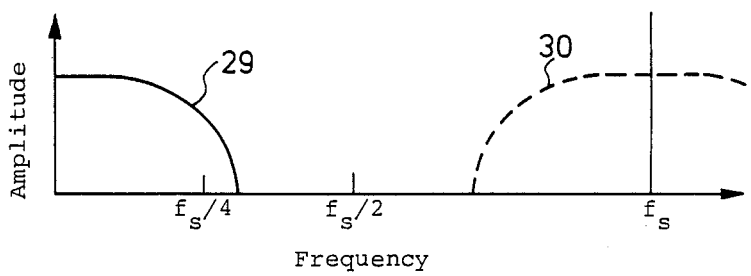
FIG. 5
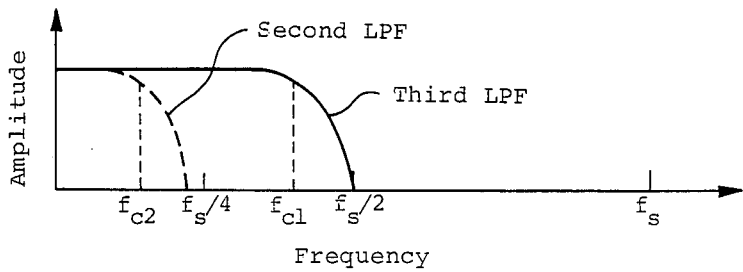

SUB-NYQUIST SAMPLING APPARATUS WITH IMPROVED EFFECTS PROCESSING

This is a continuation of application Ser. No. 760,250, filed July 29, 1985 which was abandoned upon the filing hereof.

BACKGROUND OF THE INVENTION

1. Field of the Invention

The present invention relates generally to a recording and reproducing apparatus, and particularly to recording and reproducing apparatus of the digital type, and more particularly to a digital VTR or a digital information recording and reproducing disc apparatus.

2. Description of the Prior Art

Hitherto, several proposals have been made on digital VTRs (Video Tape Records) for recording image signals in digital codes. When the image signal is digitally coded, necessary data rates therefor become a very large value, of typically 100-200 M bits/sec. The key problem at the present time is to achieve a substantially same per-area information recording performance on the recording media as the conventional analog type VTR or disc. As one of measures to solve the above problem a proposal has been made to set a sampling frequency at a frequency lower than the Nyquist rate (double the necessary highest frequency of the image signal), thereby to decrease the data rate. This method is called a sub-Nyquist sampling method. The fact that there is a need to set the sampling frequency to be greater than twice the frequency of the above-mentioned necessary highest frequency is well known as sampling and is referred to as the Nyquist rate. It is also known that when using correlation in the image signal, the image signal can be reproduced substantially without any deterioration of its quality using a so-called sub-Nyquist sampling method. The sub-Nyquist sampling method is further classified into two kinds: A first one uses intra-field correlation, and a second one uses inter-field correlation. In view of the picture quality, the latter, i.e., the sub-Nyquist sampling method using the inter-field correlation is superior to the former one, which uses the intra-field correlation. The present invention relates to an improvement in the inter-field sub-Nyquist sampling method.

By applying the inter-field sub-Nyquist sampling method to a digital VTR or digital disc recorder, a recording and reproducing apparatus of good picture quality and low recording medium consumption is obtainable. Since VTRs and the recording disc apparatus use substantially the same principle, hereinafter the description is made taking the VTR as example, but the same applies also to the disc type recording apparatus.

Let us define that reproducing mode of recorded information with a tape running at the same speed as the recording is normal reproducing mode, then a VTR has a need that it must reproduce an image signal recorded on a tape which is driven at such a high speed as 10 times the speed of the normal reproducing mode with sufficient quality of picture to be produced. The digital VTR using the inter-field sub-Nyquist sampling method has a necessity to attenuate an alias component of the reproduced signal by passing through an interpolating filter, wherein correlation between two or more neighboring fields is utilized in the reproduction of the signal. In the normal reproduction mode, the interpolation can be made by delaying the correlation signal of the previous field for a period of one field. However, in the high speed reproduction mode, due to the necessity of skipping reproduction, taking of correlation signal of the previous field is impossible. Furthermore, in a slow reproducing mode wherein the reproducing is made in a slower speed than the normal reproducing mode, sometimes the taking of correlation signal of the previous field may be impossible. Still furthermore, in a still-reproducing mode, wherein a signal for one field only is reproduced, it is impossible to take the correlation signal with the previous one field, too. Thus, in the digital image information recording apparatus using the inter-field sub-Nyquist sampling method, there is a shortcoming that in special picture reproducing modes such as high speed reproducing mode, slow speed reproducing mode and still reproducing mode, the picture quality is very bad.

SUMMARY OF THE INVENTION

The purpose of the present invention is to provide a recording and reproducing apparatus utilizing the inter-field sub-Nyquist sampling method which is capable of reproducing recorded information in special reproducing modes such as high speed reproducing, slow speed reproducing or still reproducing, without noticeable deterioration of picture quality to be reproduced therewith.

The recording and reproducing apparatus in accordance with the present invention comprises:
  signal coding means for carrying out a sub-Nyquist sampling on image signal,
  recording means for recording information on a recording medium based on a signal produced by the signal coding means,
  reproducing means for reproducing the information from the recording medium,
  interpolating means for carrying out interpolation on a signal based on output signal of the reproducing means by utilizing correlation between image signals in two or more neighboring fields, and
  means for disabling function of the interpolating means when mode of reproducing by the reproducing means is a high speed reproducing mode.

BRIEF DESCRIPTION OF THE DRAWING

FIG. 1 is a block diagram of one preferred embodiment of the present invention.

FIG. 2 is a chart illustrating inter-field sub-Nyquist sampling.

FIG. 3 is a schematical frequency spectral diagram showing the sub-Nyquist sampling.

FIG. 4 is a schematical frequency spectral diagram showing the spectrum after the interpolation.

FIG. 5 is a schematical frequency spectral diagram showing the frequency characteristic of a LPF corresponding to the case of the spectral frequency of FIGS. 3 and 4.

DESCRIPTION OF THE PREFERRED EMBODIMENT

Figure 6:
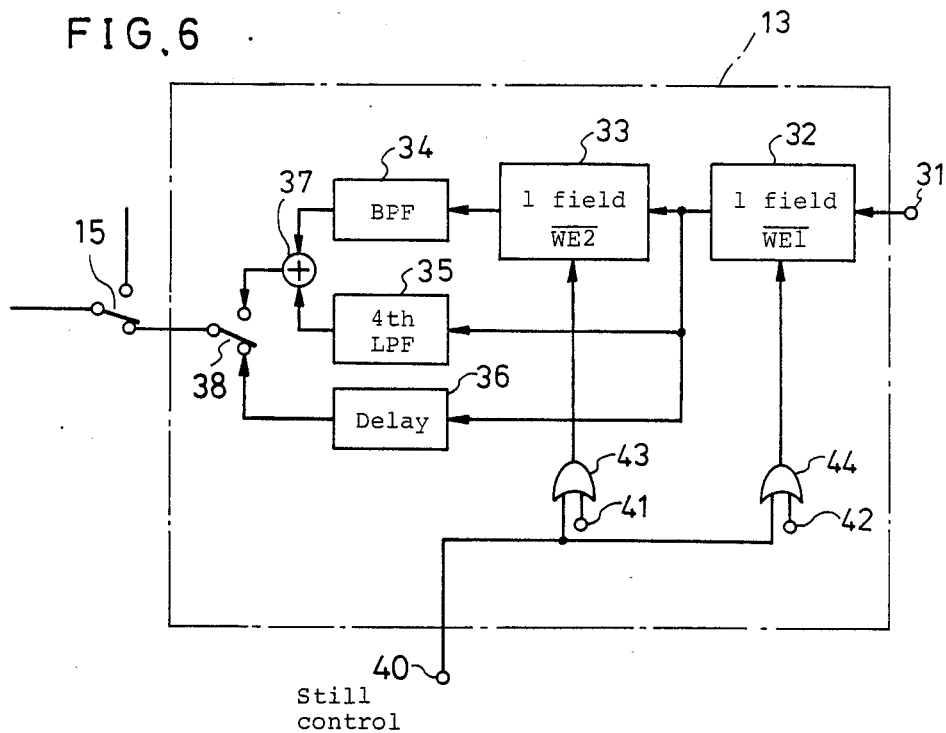
FIG. 6 is a block diagram showing a detailed configuration of the inter-field sub-Nyquist sampling interpolater 13 shown in FIG. 1.

FIG. 1 shows overall block diagram of the present invention.

First, a process of recording an image signal is described. An analog image signal is inputted through an input terminal 1 to a first LPF 2 whereby a high frequency range component of image signal is cut off. The output of the first LPF 2 is then sampled by a sampling frequency $f_s$ in an analog-to-digital converter 3 to produce a digital signal.

A state of a picture corresponding to the image signal is schematically shown in FIG. 2. Horizontal solid lines show horizontal scanning lines of the current field, and dotted horizontal lines show horizontal scanning lines of a previous field, in an interlace scanning to be represented between the solid horizontal lines. In the analog to digital converter 3, all the picture elements "O" and "X" are sampled. The sampled points are in orthogonal disposition between each of the current field and the previous field, and furthermore, all the picture elements in the current field and the previous field in total are also, in orthogonal disposition. The signal formed by this sampling is then sub-sampled by an inter-field sub-Nyquist sampling pre-filter 4. In passing the inter-field sub-Nyquist sampling pre-filter 4, the information of the sampled points "X" are thinned out. Thereby the sampled frequency becomes $f_s/2$, and the sampled points designated by the "O" are disposed in vertical directions in each field, and the vertical lines between the neighboring fields are offset by horizontal directions corresponding to $1/f_s$. When the above-mentioned relations are represented by a frequency spectrum diagram, the relation becomes as shown in FIG. 3, wherein a solid line curve 25 shows a frequency spectrum of the original image signal, dotted line curve 27 shows an alias component formed by the analog to digital conversion having a frequency $f_s$ as center frequency, and a dotted line curve 26 is another alias component formed by the sub-sampling made by the inter-field sub-Nyquist sampling pre-filter 4 having center frequency at $f_s/2$. The frequency spectrum 25 and the frequency spectrum 26 superpose at the portion 28 shown by hatching. However, as shown by FIG. 2, the sub-sampled points are offset between the neighboring fields and the frequency spectrums of the image signal center at the parts of an integer times of the field frequency. Therefore a frequency spectrum 26 of the alias component is disposed in gap spaces between frequency spectrums 25 which are disposed at pitches of the field frequency. The output of the inter-field sub-Nyquist sampling pre-filter 4 is then given to an error protection encoder 5, wherein coding is performed by using, for instance a Reed-Solomon code. The code used in the error protection encoder is not limited to the above-mentioned one and furthermore, the coding may be omitted depending on the case. Thereafter, the output of the error protection encoder 5 is further given to a channel coding encoder 6, wherein coding such as a modified frequency modulation (MFM) is carried out. The kind of the coding in the channel coding encoder is not necessarily limited to that, but only randomizing the data and recording by an NRZ may be made. Next, in a recording processor 7, the digital signal wave shape is amplified and the amplified signal current is output to a recording head 8.

Next, the process of reproducing the recorded information on the recording media 89 is described. The information recorded on the recording media 89 is reproduced into an analog electric signal by a reproducing head 9, and the electric signal is given to a reproducing processor 10 wherein the signal is amplified and the waveform is regulated, and clock pulse is extracted by a clock recovery circuit therein. By using the clock pulse, a digital signal is produced. The digital signal is then given to a channel coding decoder 11 which decodes in a reverse action to the encoding by the channel coding encoder 6, and the output of decoded signal is given to an error protection decoder 12, wherein decoding as a reverse action to the coding by the error protection encoder 5 is made. In general, the error protection decoder 12 includes a large capacity RAM (random access memory) and fluctuation of the digital data due to jittering of the travelling of the recording tape or rotation of the recording disc is compensated thereby. The output signal of the error protection decoder 12 is given to an inter-field sub-Nyquist sampling interpolater 13, wherein interpolation for the thinned-out information by the inter-field sub-Nyquist sampling pre-filter 4 during the recording process is made. That is, the inter-field sub-Nyquist sampling interpolater the 13 interpolates samples "X" shown in FIG. 2. By making the interpolation by using correlations between two or more neighboring fields, alias component 28 which is contained in a hatched area 28 shown in FIG. 3 which contain the alias component can be removed, and resultantly the output of the interpolater 13 becomes as shown in FIG. 4. Thereafter by using a digital-to-analog converter 16, the interpolated digital signal is converted to an analog signal, and undesirable an alias component 30 having frequencies of $f_s$ times an integer as their center frequencies as shown in FIG. 4 are removed by a third LPF 18. The spectral characteristic of the third LPF 18 is shown in FIG. 5, wherein the cut-off frequency $f_{c1}$ is lower than $f_s/2$, and hence the output of the third LPF 18 has sufficient attenuation at the frequency of $f_s/2$. Incidentally, the first LPF 2 also has a similar characteristic.

In a high speed reproducing mode, a VTR of a recording disc or the like information recording apparatus generally make the signal reproducing by skipping on recorded track. Therefore in the reproducing of signal in such high speed reproducing, the correlation between two or more neighboring fields in the interpolator 13 can not be used, and also there are cases wherein the correlation of signal is not obtainable in slow speed reproducing. Accordingly, the mode of reproducing the image signal is classified into two, that is, a first kind reproducing mode which contains at least normal speed reproducing wherein information on the recording media is reproduced with normal speed driving of the recording tape or recording disc, and a second type reproducing mode which contains at least high speed reproducing mode wherein reproducing is made by running the recording media in a speed higher than the normal speed. Then, in this invention, in the first type reproducing mode, by using the inter-field sub-Nyquist sampling interpolater 13, the frequency spectrum is converted from the state of FIG. 3 to the state of FIG. 4. After the D/A conversion in the D/A converter 16, the reproduced analog signal corresponding to the original image signal 29 of FIG. 4 is taken out through the third LPF 18 by using the cut-off characteristic shown in FIG. 5. Furthermore, in the second type reproducing mode, the inter-field sub-Nyquist sampling interpolater 13 is bypassed by turning the switch 15 to the position whereby the interpolater 13 is bypassed. Therefore, the signal in the state of FIG. 3 is given to the D/A converter 16, and the output of the D/A converter 16 is given to a second LPF 17, whose cut-off frequency $f_{c2}$ is lower than $f_{c1}$ of the third LPF 18, thereby to remove the alias component having center frequencies at integer times of $f_s/2$. In this case, high frequency range component of the initial image signal 25 is partially lost, but the output signal is sufficiently usable as the second type reproducing mode signal. The cut-off frequency $f_{c2}$ of the second LPF 17 is selected considering a balance between cross talk of alias component 26 and loss of high frequency component for the original image signal and by examining the actual picture quality. The experimental study indicates that in general, such a selection that $f_{c2}$ is lower than $f_s/4$ produces good results.

The detailed circuit configuration for operating of the present invention is elucidated with reference to FIG. 1. An output signal of the error protection decoder 12 is fed to the interpolator 13 and also to the bypass connection 14. The output signal of the inter-field sub-Nyquist sampling interpolator 13 and the bypass connection 14 are selected by the change-over switch 15. The controlling of the change-over switch 15 is carried out by the reproducing mode control 22 which discriminates between the first reproducing mode and the second reproducing mode by outputting two states signal, namely a High state corresponding to the first reproducing mode and a Low state corresponding to the second reproducing mode. When the reproducing mode control 22 is in the first reproducing mode state, the switch 15 is connected to the side of the output terminal of the inter-field sub-Nyquist sampling interpolator 13, and when in the second reproducing mode, the switch 15 is connected to the bypass connection 14. A digital signal selected by the switch 15 is sent to the DA converter 16. A clock signal supplied to the DA converter 16 is given from a first clock signal terminal 23 for supplying a clock signal $f_s$ through a switch 21 connected to its side when the mode of the reproducing mode control 22 is in the first reproducing mode, and when the mode of the reproducing mode control 22 is in the second reproducing mode, an offset clock signal $f_s/2$ is given from a second clock signal input terminal 24 and the change-over switch 21 connected to its side. The clock signal $f_s$ corresponds to the samplings for both picture elements of "O" and "X" in FIG. 2, and the offset clock $f_s/2$ corresponds to a sampling only of the picture elements "O". Output signal of the DA converter 16 is given to the third LPF 18 and the second LPF 17. Either one output signal of the second LPF 17 or the third LPF 18 is selectively given to the output terminal 20, and the selection is made by the reproducing mode control 22 in a manner that when the mode of the reproducing mode control 22 is the first reproducing mode the switch 19 is connected to the side of the third LPF 18, and when the mode is the second reproducing mode the switch is connected to the second LPF 17.

Besides the high speed reproducing mode, the recording and reproducing apparatus in accordance with the present invention also has a good technical advantage in the still-reproducing mode. Here, operation in the still-reproducing mode is described.

Figure 7:
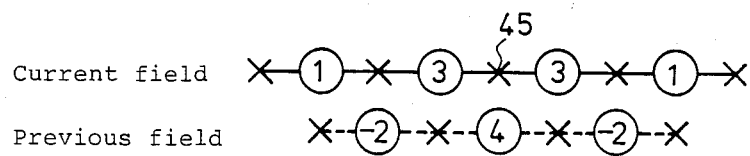
FIG. 7 is a schematic chart showing function of the interpolater and coefficients of a fourth LPE and a BPF of FIG. 6.

The inter-field sub-Nyquist sampling interpolator 13 shown in FIG. 1 has a detailed configuration as shown in FIG. 6. A 1-field memory 32 is connected to receive an input signal from the input terminal 31, and to send its output signal to another 1-field memory 33. Also, the output signal of the former 1-field memory 32 is given to a fourth LPF 35 and a delay circuit 36. The output signal of the latter 1-field memory 33 is sent to a BPF 34. Then output signals of the BPF 34 and the fourth LPF 35 are added in a full adder 37, and the resultant added signal and output signal of the delay circuit 36 are connected to the change over switch 38. The first 1-field memory 32 may be realized by using a part of field memory contained in the error protection decoder in common, and this memory serves to supply signal for 1-field for the still-reproducing mode. The second 1-field memory 33 is for obtaining correlation with a preceding field. That is, in NTSC, to make an interpolation of sampled points "X" designated by 45 in FIG. 7, the interpolation is carried out from an immediately lower line of the previous fields. This is because that in NTSC signal, phases of the sub-carrier signals agree when the above-mentioned way of interpolation is adopted. Thus, when NTSC signal is used, the 1-field memory 33 is designed to issue a signal which is older by 262H, where H is a period for one horizontal scanning. When correlation of signals of neighboring n field are compared, n-1 memory is necessary, but such plural memory can be disposed as several areas of a large memory. Furthermore, as is seen from FIG. 3, since the alias signal overlapping with the original image signal 25 overlaps in the high frequency range part of the original image signal, the signal to be interpolated from the previous field's information is enough with the portion 28 indicated by the hatching having $f_s/4$ as its center. The BPF 34 is provided to limit the frequency range to be interpolated from the previous field to the above-mentioned portion 28. Accordingly, the low frequency component 25 is interpolated from the current field, being issued from the LPF 35. The LPF 35 and the BPF 34 can be constituted as a symmetric type transversal filter. One actual example of the coefficients of the symmetric type transversal filter is shown in FIG. 7, wherein numerals in the circles designate coefficients of the following expression:

Therefore, the expression of the fourth LPF 35 is:

$$f_{LPF}(Z) = Z^{-3} + 3Z^{-1} + 3Z^1 + Z^3 \qquad (1)$$

wherein $Z = e^{-i\omega T}$ and $T = 1/f_s$.

Similarly, the BPF 34 has an expression indicated as follows:

$$f_{BPF}(Z) = -2Z^{-2} + 4 - 2Z^2 \qquad (2)$$

Furthermore, expression of the delay circuit 36 is $$f_{delay}(Z) = 1 \times Z^0 = 1 \qquad (3)$$

That is, the delay circuit 36 delays by 3T in order to make agreement to the fourth LPF 35. The switch 38 changes over the interpolation signal from the full adder 37 and the samples corresponding to "O" of FIG. 7 from the delay circuit 36 by a period of 2T.

In the circuit of FIG. 6 configurated in the above-mentioned way, write-enable signal for use in the 1-field memories 32 and 33 are supplied from input terminals 41 and 42 through OR circuits 43 and 44, which receive at their other input terminals still control signals from a still control signal input terminal 40. The still control signals given from the terminal 40 is in Low state except in the still-reproducing mode, and the write enable signal at the terminals 41 and 42 acts on the 1-field memory 32 or 33 as it is. But, when the mode becomes the still-reproducing mode, the still control signal given from the terminal 40 becomes high state, and therefore the 1-field memories 32 and 33 turn to write-disabled state at the same time. By this, the signal of the previous field is fixed in the 1 field memory 33, and the signal of the current field is fixed in the 1 field memory 32. In the above-mentioned way, even with the configuration of the recording and reproducing apparatus using the inter-field sub-Nyquist sampling method, the still-reproducing is possible with good quality.

As has been described, according to the present invention, even in using the inter-field sub-Nyquist sampling method, special reproducing modes which is other than the normal reproducing mode, that is, high speed reproducing mode, slow speed reproducing mode or still-reproducing mode, sufficiently good picture quality is obtainable.

Furthermore, flame advance reproducing mode which is a series of still-reproducing mode can be similarly realizable as a series of a number of still-reproducing modes.

What is claimed is:

1. An apparatus for recording and reproducing an image signal on a recording medium comprising:
   signal coding means for carrying out a sub-Nyquist sampling on said image signal;
   recording means for recording information on said recording medium based on a signal produced by said signal coding means;
   reproducing means for reproducing said information from said recording medium;
   interpolating means for carrying out an interpolation on a signal based on an output signal of said reproducing means by utilizing a correlation between image signals in two or more neighboring fields, wherein said interpolating means comprises:
   field memory means disposed to receive said output signal of said reproducing means, comprising a first field memory means, and a second field memory means which receives an output of said first field memory means, said field memory means for selectively interpolating a sub-Nyquist sampled signal based on signals read out of said first field memory means and said second field memory means; and
   by-passing means for by-passing said interpolating means when a mode of reproducing by said reproducing means is a high speed reproducing mode, and ceasing said by-passing when a mode of reproducing by said reproducing means is a normal speed reproducing mode.

2. An apparatus for recording and reproducing an image signal on a recording medium comprising:
   signal coding means for carrying out a sub-Nyquist sampling on an image signal;
   recording means for recording information on said recording medium based on a signal produced by said signal coding means;
   reproducing means for reproducing said information from said recording medium;
   interpolating means for carrying out an interpolation on a signal based on an output signal of said reproducing means, by utilizing a correlation between image signals in two or more neighboring fields;
   by-passing means for by-passing said interpolating means when a mode of reproducing by said reproducing means is a high speed reproducing mode to produce an output signal;
   a first low-pass filter for passing only a low frequency component of an output signal of said interpolating means; and
   a second low-pass filter for passing only a low frequency component of said output signal of said by-passing means, a cut off frequency of said second low-pass filter being lower than that of said first low-pass filter.

3. An apparatus in accordance with claim 2, wherein said cut-off frequency of said second low-pass filter is lower than half of that of a sub-Nyquist sampling frequency.

* * * * *